United States Patent [19]

Rometsch et al.

[11] 3,846,982
[45] Nov. 12, 1974

[54] HYDROSTATIC DRIVE FOR AUTOMOTIVE VEHICLES OR THE LIKE

[75] Inventors: Werner Rometsch, Gerlingen; Karl Veil, Uhingen, both of Germany

[73] Assignee: Robert Bosch GmbH, Stuttgart, Germany

[22] Filed: May 29, 1973

[21] Appl. No.: 364,439

[30] Foreign Application Priority Data
June 27, 1972 Germany............................ 2231421

[52] U.S. Cl......................... 60/445, 60/464, 60/488
[51] Int. Cl............................................. F16h 39/46
[58] Field of Search ............ 60/445, 447, 456, 464, 60/465, 488, 19

[56] References Cited
UNITED STATES PATENTS

| | | |
|---|---|---|
| 3,214,911 | 11/1965 | Kempson ................................. 60/19 |
| 3,236,049 | 2/1966 | Reinke ................................. 60/464 X |
| 3,477,225 | 11/1969 | Cryder et al. ..................... 60/447 X |
| 3,659,419 | 5/1972 | Ikeda ..................................... 60/456 |

*Primary Examiner*—Edgar W. Geoghegan
*Attorney, Agent, or Firm*—Michael S. Striker

[57] ABSTRACT

A hydrostatic transmission for automotive vehicles wherein an adjustable pump is connected with a hydraulic motor by a high-pressure line and a low-pressure line and the heat engine for the adjustable pump further drives an auxiliary pump whose outlet is secured by a relief valve and which serves to deliver fluid to the low-pressure line as well as to an actuator for the adjustable pump. A scavenger valve is provided to evacuate heated fluid from the low-pressure line and has a body for a reciprocable valve member whose ends are subjected to fluid pressure in the high- and low-pressure lines and are biased by prestressed springs which insure that the pressure in the high-pressure line invariably exceeds that pressure which is necessary for the opening of relief valve. Therefore, the fluid pressure in the high-pressure line does not drop excessively when the motor operates as a pump during coasting and the adjustable pump operates as a motor.

10 Claims, 3 Drawing Figures

PATENTED NOV 12 1974

HYDROSTATIC DRIVE FOR AUTOMOTIVE VEHICLES OR THE LIKE

BACKGROUND OF THE INVENTION

The present invention relates to hydrostatic drives for automotive vehicles or the like. More particularly, the invention relates to improvements in hydrostatic transmission of the type wherein a hydraulic motor is connected with one or more adjustable hydraulic pumps by high-pressure and low-pressure lines and wherein an auxiliary pump serves to deliver fluid to the low-pressure line as well as to supply fluid for adjustment of the adjustable pump or pumps.

It is already known to provide a hydrostatic transmission of the just oulined characters with a scavenger valve which can open to discharge heated fluid from the low-pressure line and whose outlet is controlled by a relief valve. Another relief valve controls the outlet of the auxiliary pump. The valve member of the scavenger valve is disposed between two springs which are unstressed in the neutral position of the valve member, and the latter seals all ports of the scavenger valve when it assumes its neutral position. The pressure of fluid which the auxiliary pump supplies to the adjusting means for the adjustable pump or pumps is identical with the pressure that is needed to open the relief valve at the outlet of the auxiliary pump. A drawback of such hydrostatic transmissions is that the pressure of fluid in the low-pressure line drops excessively when the vehicle begins to coast, i.e., when the motor begins to act as a pump and the adjustable pump or pumps act as motor(s).

SUMMARY OF THE INVENTION

An object of the invention is to provide a hydrostatic drive for automotive vehicles or the like wherein the pressure of fluid in the lines connecting one or more adjustable pumps with the motor is always sufficiently high to allow for adjustment of the pump or pumps, irrespective of whether the vehicle is driven by or drives the motor.

Another object of the invention is to provide the hydrostatic drive with a novel and improved scavenger valve.

A further object of the invention is to provide novel and improved relief valve means which insure that the pressure in the high-pressure line remains above a predetermined minimum level during each and every stage of operation of the vehicle.

An additional object of the invention is to provide a scavenger valve which can be used as a superior substitute for the scavenger valves of existing hydrostatic drives for automotive vehicles or the like.

Still another object of the invention is to provide a novel and improved method of preventing excessive drop of fluid pressure in conduit means which connect one or more adjustable pumps with a motor in a hydrostatic transmission for automotive vehicles or the like.

A further object of the inveniton is to provide a hydrostatic drive which is more reliable and less prone to malfunction than conventional hydrostatic drives.

The hydrostatic drive of the present invention comprises at least one adjustable first pump, a hydraulic motor, high- and low-pressure lines connecting the pump with the motor, hydraulic adjusting means for the pump, an auxiliary pump having an outlet and relief valve means arranged to open in response to a predetermined fluid pressure at the outlet, a heat engine or another suitable prime mover for the pumps, conduit means connecting the outlet of the auxiliary pump with the low-pressure line and with the adjusting means, and a novel scavenger valve having a body, a valve member which is reciprocable in the body and has first and second ends respectively subjected to fluid pressure in the high- and low-pressure lines, and first and second prestressed springs reacting against the body and respectively bearing against the first and second ends of the valve member. The valve member is movable between a neutral position and at least one second position in which latter position the scavenger valve allows heated fluid to flow from the low-pressure line, and the bias of the springs is selected in such a way that the valve member leaves its neutral position only when the fluid pressure in the high-pressure line exceeds the predetermined pressure which is needed to open the relief valve means. This insures that the fluid pressure in the high-pressure line cannot drop excessively when the vehicle which is driven by the motor begins to coast, i.e., when the motor acts as a pump, the adjustable pump or pumps act as a motor, and the high- and low-pressure lines respectively become low- and high-pressure lines.

The conduit means between the outlet of the auxiliary pump and the low-pressure line contains a check valve which prevents the flow of fluid toward the outlet. A double check valve is preferably provided in the conduit means between the outlet of the auxiliary pump and the adjusting means for the adjustable pump or pumps.

The novel features which are considered as characteristic of the invention are set forth in particular in the appended claims. The improved hydrostatic drive itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
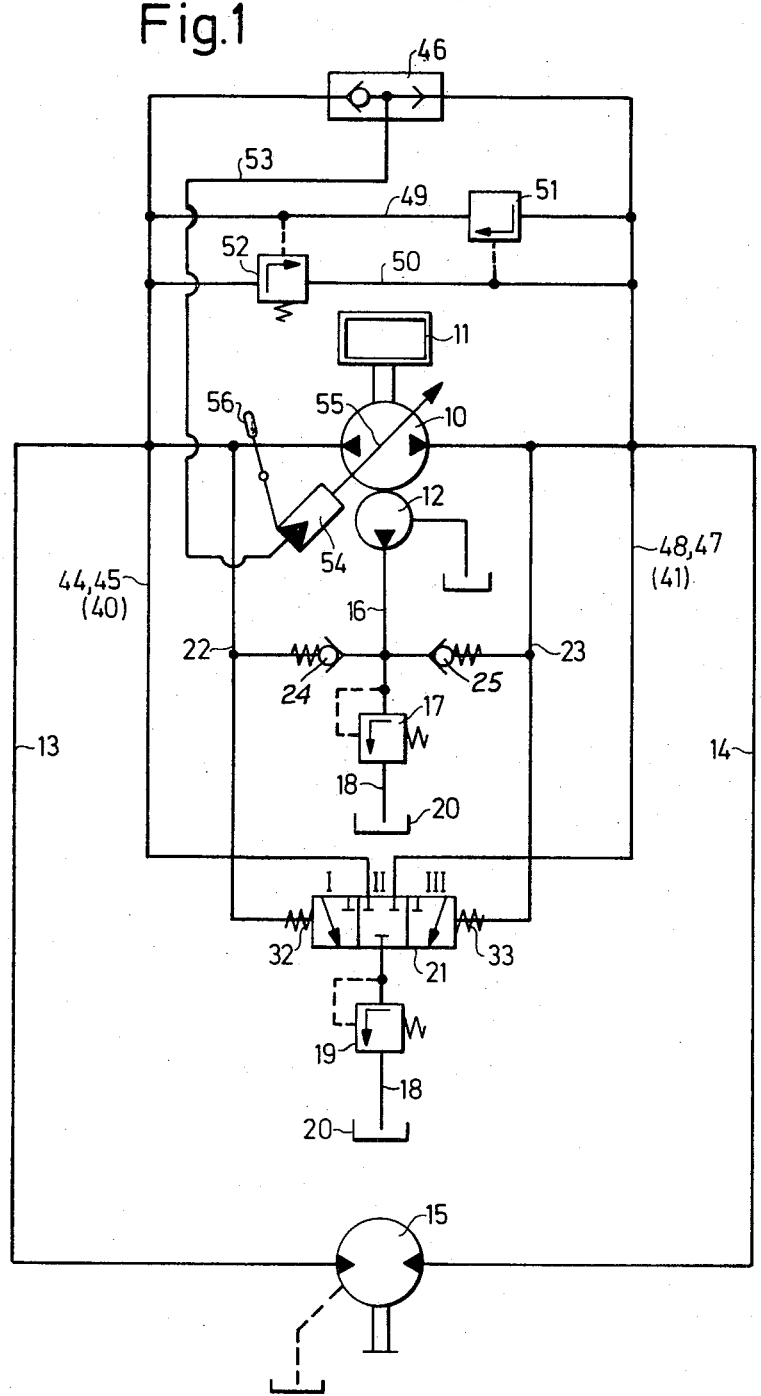
FIG. 1 is a diagrammatic view of a hydrostatic drive which embodies the invention.

Referring first to FIG. 1, there is shown a hydrostatic drive which comprises a variable-displacement reversible hydraulic pump 10 which is driven by a prime mover 11, e.g., the internal combustion engine of an automotive vehicle. The prime mover 11 further drives an auxiliary pump 12 so that the latter is operated in synchronism with the adjustable pump 10. A bidirectional hydraulic motor 15 which drives the wheels of the automotive vehicle is connected with the pump 10 by a high-pressure line 13 and a low-pressure line 14.

Figure 2:
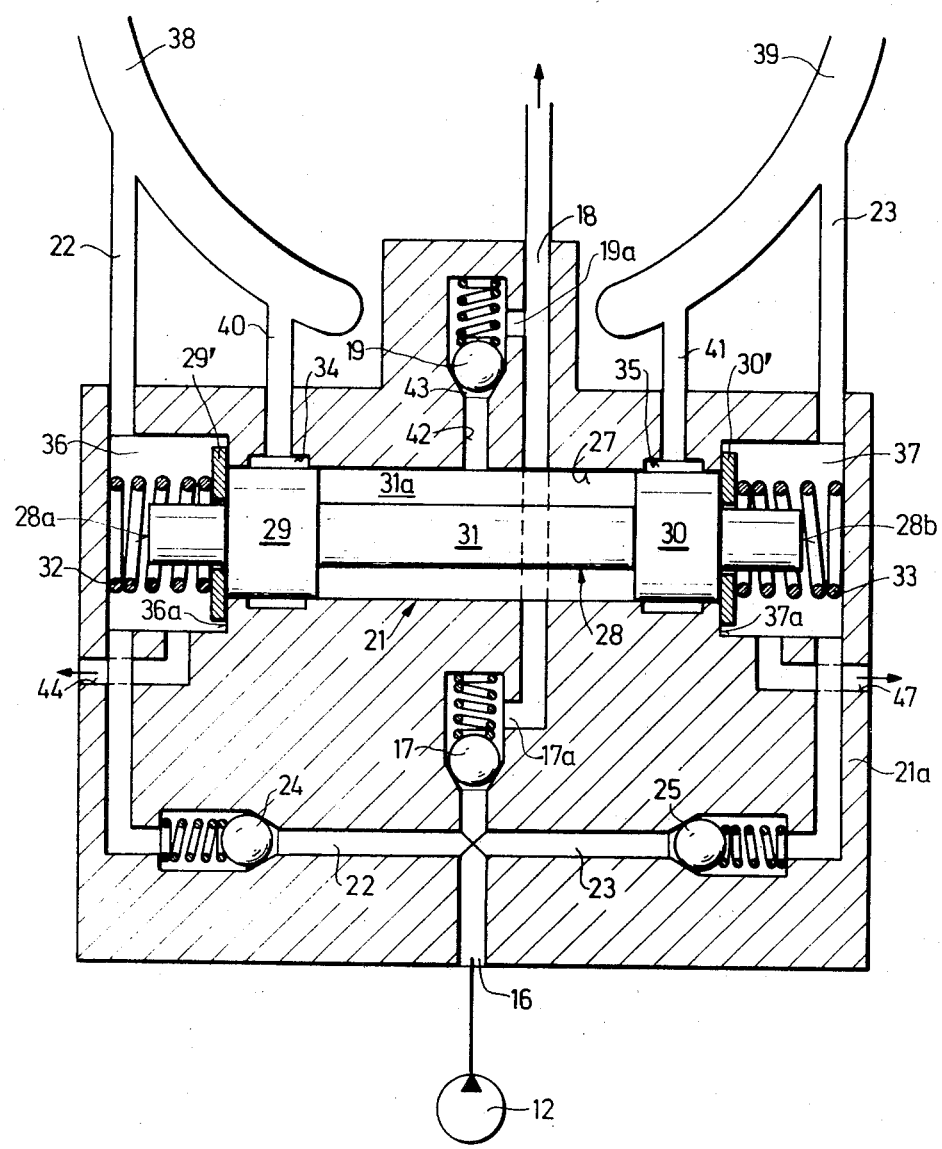
FIG. 2 is an enlarged sectional view of the scavenger valve and of certain other details, with the valve member of the savenger valve shown in a neutral position.

The outlet of the auxiliary pump 12 is connected with a conduit 16 which contains a relief valve 17 arranged to open in response to a predetermined fluid pressure at the outlet. The outlet port 17a (see FIG. 2) of the relief valve 17 is connected with the outlet port 19a of a second relief valve 19 by a channel or conduit 18 discharging into a tank 20. When the relief valve 19 is open, the channel 18 communicates with the outlet 42 in the body 21a of a scavenger valve 21 the details of which are illustrated in FIG. 2. While in FIG. 1 a separate conduit 18 and a separate tank 20 is shown for each of the relief valves 17 and 19, this is done for simplification of the illustration, and the actual construction is shown in FIG. 2, in which the outlet port 19a of the valve 19 communicates with the single conduit 18.

The body 21a of the scavenger valve 21 has a bore 27 for a reciprocable valve member 28 which is movable between three positions I, II, III including a neutral position II shown in FIGS. 1 and 2. The conduit 16 which is connected with the outlet of the auxiliary pump 12 is further connected with conduits 22, 23 which respectively communicate with the high-pressure line 13 and low-pressure line 14. The conduits 22, 23 respectively contain one-way ball check valves 24, 25 which prevent the flow of fluid from the lines 13, 14 toward the outlet of the auxiliary pump 12.

Referring again to FIG. 2, the valve member 28 has two spaced-apart plungers or lands 29, 30 which are respetively adjacent to its left-hand and right-hand ends 28a, 28b. The plungers 29, 30 are movable in the bore 27 with minimal clearance. the median portion 31 of the valve member 28 is of reduced diameter and defines with the body 21a an annular chamber 31a which is in communication with the outlet 42 containing the aforementioned relief valve 19. The latter comprises a ball which is biased by a spring so that it normally engages a seat 43 in the body 21a. The construction of the relief valve 17 for the outlet of the auxiliary pump 12 is similar to that of the relief valve 19.

The body 21a further defines two compartments 36, 37 which respectively receive the ends 28a, 28b of the valve member 28 and prestressed helical springs 32, 33. The spring 32 reacts against the body 21a and indirectly biases the end 28a in a direction to the right, as viewed in FIG. 2, through the intermediary of a washer 29' which bears against the adjacent end face of the plunger 29 and/or against an internal shoulder 36a of the body 21a in the compartment 36. Analogously, the spring 33 in the compartment 37 can bias the valve member 28 in a direction to the left, as viewed in FIG. 2, through the intermediary of a second washer 30' which abuts against the right-hand end face of the plunger 30 and/or against an internal shoulder 37a of the body 21a in the compartment 37. The initial stressing of the springs 32, 33 is considerable, also when the valve member 28 dwells in the neutral position II of FIGS. 1 or 2.

The valve body 21a is further provided with two annular grooves 34, 35 which respectively surround the pistons 29, 30 of the valve member 28 and whose axial length, as considered in the axial direction of the valve member 28, is less than the axial length of the respective pistons 29, 30. When the springs 32, 33 maintain the valve member 28 in the neutral position II of FIG. 2, the pistons 29, 30 respectively seal the grooves 34, 35 from the chamber 31a, i.e., from the bore 27 in the body 21a.

The compartment 36 is in communication with the conduit 22 downstream of the check valve 24 and this compartment further communicates with a first arcuate port or recess 38 of the pump 10. The compartment 37 communicates with the conduit 23 (downstream of the check valve 25) and with a second arcuate recess or port 39 of the pump 10. The recesses 38, 39 respectively communicate with the high- and low-pressure lines 13,14. 13, 14. conduit or channel 40 connects the recess 38 with the groove 34, and a conduit or channel 41 connects the groove 35 with the recess 39.

The compartment 36 is connected with a double check valve 46 (FIG. 1) by means of conduits 44, 45. Conduits 47, 48 connect the compartment 37 with the valve 46 which latter can connect the conduit 45 or 48 (i.e., the line 13 or 14) with a further conduit 53 for admission of pressurized fluid to an adjusting device or actuator 54 for the pump 10. The conduit 53 is connected with that one of the lines 13, 14 wherein the fluid pressure is higher, i.e., normally with the high-pressure line 13. The pressure in the line 14 will exceed the pressure in line 13 when the vehicle is coasting so that the wheels drive the motor 15 and the pump 10 acts as a motor.

The conduits 45, 48 are connected to each other by two conduits 49, 50 which respectively contain relief valves 51, 52. The valves 51, 52 respectively open when the fluid pressure in the conduits 48, 45 rises to a predetermined value. When it opens, the valve 51 allows fluid to flow from the conduit 48 to the conduit 45. The opening of valve 52 results in a flow of fluid from the conduit 45 into the conduit 48. It will be noted that the valves 51, 52 prevent excessive rise of fluid pressure in the lines 14 and 13, respectively.

The adjusting device 54 can change the position of an adjustable member 55 of the pump 10. The direction of adjustment of the device 54 is selected by a lever 56. For example, the pump 10 may constitute an axial piston pump wherein the member 55 is a tilting plate, the device 54 is a means for changing the inclination of the tilting plate, and the lever 56 is a means for reversing the angle of tilt of the plate 55. The recesses 38, 39 shown in FIG. 2 then constitute the ports of the valve plate in the pump 10. It is clear that the pump 10 can also constitute a radial piston pump or a vane pump.

The operation:

It is assumed that the pump 10 is in a neutral position, i.e., the inclination of the tilting plate 55 is such that the pump 10 does not deliver any fluid. Therefore, the adjustment of the tilting plate 55 must take place in response to delivery of pressurized fluid from an auxiliary source (pump 12). Since the pump 12 is driven by prime mover 11 in synchronism with the pump 10, its outlet discharges pressurized fluid into the conduit 16 (it is also within the purview of the invention to provide discrete first and second connections between the output element of the prime mover 11 and the pumps 10, 12). The conduit 16 supplies pressurized fluid into the conduits 22, 23 so that the check valves 24, 25 open and admit pressurized fluid into the lines 13, 14 as well as into the conduits 45, 48.

It is assumed that the operator of the vehicle has moved the lever 56 to a position which insures that, when the tilting plate 55 leaves its neutral position, the pump 10 delivers pressurized fluid into the line 13. The pressurized fluid which is needed to change the position of the tilting plate 55 from neutral is supplied by the auxiliary pump 12 via conduit 45, double check valve 46, conduit 53 and into the adjusting device 54. The pressure in the line 13 rises, and such pressure is propagated into the conduit 22 to effect a closing of the check valve 24. From then on, the auxiliary pump 12 can deliver fluid only via conduits 16, 23 and into the conduit 48 and line 14. The latter thus becomes a low-pressure line which receives a continuous stream of low-pressure fluid.

The pressure in the conduit 22 propagates itself into the compartment 36 of the body 21a (see FIG. 2) and acts against the end 28a of the valve member 28 so that the latter tends to move in a direction to the right, as viewed in FIG. 2. It is assumed that the relief valve 17 in the conduit 16 opens in response to a fluid pressure which equals or approximates 20 bars. In accordance with a feature of the invention, the initial stressing of the springs 32, 33 in the compartments 36, 37 is selected in such a way that the fluid pressure in the conduit 22 (high-pressure line 13) must exceed 20 bars before the valve member 28 starts to leave the neutral position of FIG. 2. For example, the pressure in the conduit 22 must rise to 27 bars before the fluid pressure in the compartment 36 suffices to effect a displacement of the valve member 28 against the opposition of the spring 33. In other words, whereas the relief valve 17 is set to open in response to a predetermined fluid pressure (20 bars) at the outlet of the auxiliary pump 12, the pressure in the line 13 must rise to a higher value (27 bars) before the valve member 28 of the scavenger valve 21 leaves its neutral position.

Figure 3:
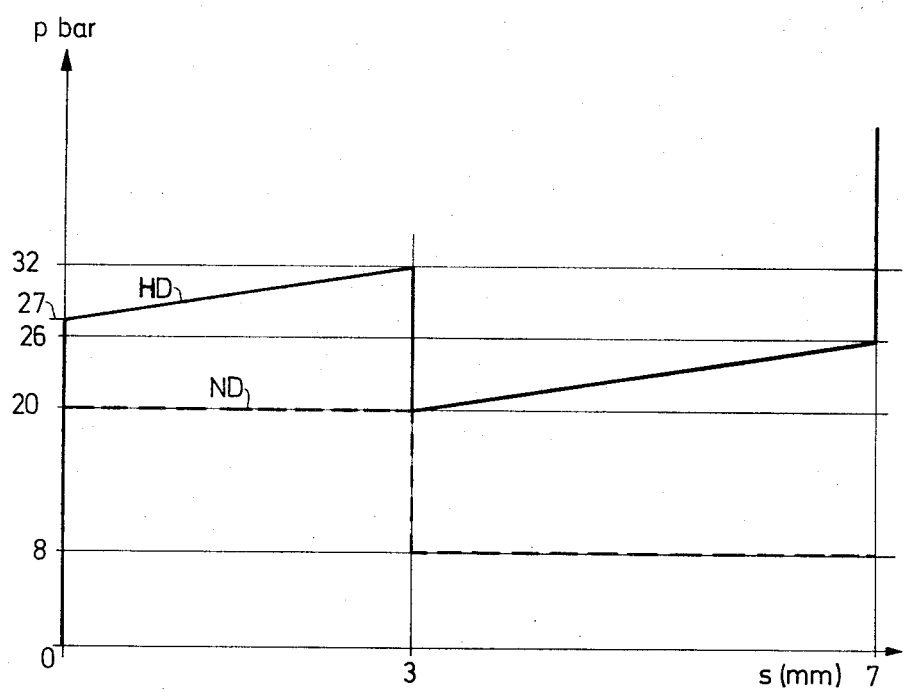
FIG. 3 is a diagram showing the changes of fluid pressure in the high- and low-pressure lines.

As the fluid which flows into the adjusting device 54 via conduit 53 changes the position of the tilting plate 55, the pump 10 begins to deliver pressurized fluid into the line 13 wherein the pressure rises so that the fluid in the compartment 36 (which is connected with the high-pressure line 13 by the conduit 22) shifts the valve member 28 against the opposition of the spring 33. The plunger 30 allows the chamber 31a around the median portion 31 of the valve member 28 to communicate with the groove 35 of the body 21a when the fluid pressure in the compartment 36 and line 13 rises to about 32 bars. The port 39 of the valve plate in the pump 10 is then free to communicate with the outlet 42 by way of the channel 41 and chamber 31a. The relief valve 19 is assumed to open in response to a pressure of 8 bars. Such opening of the valve 19 results in a short-lasting drop of fluid pressure in the high-pressure circuit of the hydrostatic drive. The rightward movement of the valve member 28 is then opposed by the spring 33 and by a relatively low fluid pressure (8 bars) in the compartment 37. The just discussed changes of fluid pressure in the line 13 are indicated in FIG. 3 by the curve HD. It will be noted that the pressure in the line 13 drops from 32 bars to 20 bars in response to movement of the valve member 28 to the position III (when the groove 35 begins to communicate with the chamber 31a and outlet 42). The extent to which the valve member 28 moves from the neutral position II of FIG. 2 to the position III is assumed to be about 3 millimeters. Such shifting of the valve member 28 in response to rising fluid pressure in the compartment 36 (32 bars) results in a pressure drop to 20 bars. Such pressure begins to rise as the valve member 28 continues to move against the opposition of the spring 33 in the compartment 27 (see the curve HD in FIG. 3). After the valve member 28 covers a distance of about 7 millimeters, its end 28b reaches the adjacent internal surface of the body 21a and the latter then holds the valve member against further axial movement away from the compartment 36. The pressure in the line 13 thereupon rises to the maximum pressure which can be furnished by the pump 10. Such high pressure is communicated to fluid in the conduit 53 and adjusting device 54 because the double check valve 46 then connects the conduit 53 with the line 13 wherein the fluid pressure is higher than in the line 14. Thus, the adjusting device 54 receives fluid from that line (13) wherein the fluid pressure exceeds the pressure in the other line (14).

The broken-line curve ND of FIG. 3 represents the changes of fluid pressure in the line 14, recess 39 and conduits 23, 48. Initially, the pressure in the line 14 is constant at 20 bars (i.e., at the pressure which is needed to effect an opening of the relief valve 17). When the valve member 28 moves to the right and beyond the neutral position of FIG. 2 (through a distance of 3 millimeters so that the groove 35 communicates with the outlet 42 by way of the chamber 31a), the pressure of fluid in the recess 39 decreases to 8 bars (this is the pressure which is needed to open the relief valve 19) and thereupon remains unchanged.

The initial stressing of the springs 32, 33 is selected with a view to insure that the pressure of fluid in the line 13 (compartment 36) cannot drop below 20 bars (i.e., below that pressure which is needed to open the relief valve 17). In the absence of such stressing of the springs 32, 33, the pressure in the line 13 could decrease to such a value that it would not suffice to adjust the pump 10 by way of the device 54, especially when the vehicle begins to coast.

If the vehicle which embodies the improved hydrostatic drive travels downhill, it is automatically accelerated so that the motor 15 acts as a pump and the pump 10 acts as a motor. The line 14 then becomes the high-pressure line and the energy of the pump 10 is consumed by the towing moment of the prime mover. The double check valve 46 then connects the line 14 with the conduit 53 so that the adjusting device 54 again receives fluid from the high-pressure line. The pressure in the compartment 37 then exceeds the fluid pressure in the compartment 36 and the valve member 28 moves against the opposition of the spring 32 to connect the groove 34 with the outlet 42 by way of the chamber 31a.

An advantage of the improved hydrostatic drive is that the pressure in the conduit 53 is always high enough to insure that the device 54 can adjust the tilting plate 55 irrespective of whether the fluid pressure in the line 13 exceeds the fluid pressure in the line 14, or vice versa. Thus, the selected adjustment of the pump 10 remains unchanged regardless of whether the pump 10 drives the motor 15 or the motor 15 drives the pump 10.

Whenever the scavenger valve 21 opens, i.e., when the outlet 42 communicates with the groove 35 or 34, heated fluid can escape from the low-pressure line (14 or 13) into the tank 20 by way of the outlet 42, relief valve 19, its outlet port 19a, and channel 18. At the same time, the auxiliary pump 12 delivers cooled fluid to the low-pressure line 14 or 13 by way of the conduit 22 and check valve 24 or conduit 23 and check valve 25.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

We claim:

1. A hydrostatic drive for automotive vehicles or the like, comprising at least one adjustable first pump; a motor; high- and low-pressure lines connecting said pump with said motor; hydraulic adjusting means for said pump; an auxiliary pump having an outlet; relief valve means arranged to open in response to a predetermined fluid pressure at said outlet; prime mover means for said pumps; conduit means connecting said outlet with said low-pressure line and with said adjusting means; and a scavenger valve having a body, a valve member reciprocable in said body and having first and second ends respectively subjected to fluid pressure in said high- and low-pressure lines, and first and second prestressed springs reacting against said body and respectively bearing against said first and second ends of said valve member, said valve member being movable by pressurized fluid between a neutral position and at least one second position in which said scavenger valve allows the outflow of heated fluid from said low-pressure line, the bias of said springs upon said valve member being such that said valve member leaves said neutral position only when the fluid pressure in said high-pressure line exceeds said predetermined pressure.

2. A hydrostatic drive as defined in claim 1, further comprising check valve means provided in said conduit means to prevent the flow of fluid from said low-pressure line to said outlet.

3. A hydrostatic drive as defined in claim 1, wherein said scavenger valve has an outler which is connected with said low-pressure line in said second position of said valve member, and further comprising second relief valve means arranged to open in response to a second predetermined fluid pressure at the outlet of said scavenger valve.

4. A hydrostatic drive as defined in claim 3, wherein each of said relief valve means has an outlet port and further comprising channel means connecting said outlet ports.

5. A hydrostatic drive as defined in claim 1, wherein said valve member comprises first and second plungers respectively adjacent to said first and second ends thereof, said body having first and second annular grooves respectively connected with said high- and low-pressure lines and respectively surrounding said first and second plungers, the axial length of each of said grooves being less than the axial length of the respective plunger.

6. A hydrostatic drive as defined in claim 5, wherein said valve member is reciprocable in a bore of said body and said plungers seal said grooves from said bore in said neutral position of said valve member.

7. A hydrostatic drive as defined in claim 6, wherein said first pump includes a valve plate provided with first and second recesses respectively communicating with said high- and low-pressure lines, said first and second grooves respectively communicating with said high- and low-pressure lines by way of said first and second recesses.

8. A hydrostatic drive as defined in claim 1, further comprising a double check valve provided in said conduit means between said outlet and said adjusting means.

9. A hydrostatic drive as defined in claim 8, wherein said double check valve is further connected with said lines and is arranged to admit fluid to said adjusting means from said high-pressure line.

10. A hydrostatic drive as defined in claim 1, wherein the fluid pressure in said low-pressure line exceeds the fluid pressure in said high-pressure line when said motor acts as a pump whereby said first pump acts as a motor.

* * * * *